(12) United States Patent
Yamaoka et al.

(10) Patent No.: US 11,562,104 B2
(45) Date of Patent: Jan. 24, 2023

(54) CONTROL DEVICE, INFORMATION PROCESSING DEVICE, AND INFORMATION PROCESSING SYSTEM

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Shinnosuke Yamaoka, Fuchu Tokyo (JP); Mikio Hashimoto, Bunkyo Tokyo (JP); Atsushi Shimbo, Bunkyo Tokyo (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/470,443

(22) Filed: Sep. 9, 2021

(65) Prior Publication Data
US 2022/0309195 A1 Sep. 29, 2022

(30) Foreign Application Priority Data
Mar. 23, 2021 (JP) .............................. JP2021-048890

(51) Int. Cl.
*G06F 21/79* (2013.01)
*G06F 21/50* (2013.01)
(Continued)

(52) U.S. Cl.
CPC .............. *G06F 21/79* (2013.01); *G06F 21/50* (2013.01); *G06F 21/6209* (2013.01); *G06F 21/82* (2013.01)

(58) Field of Classification Search
CPC ....... G06F 21/79; G06F 21/50; G06F 21/6209; G06F 21/82
(Continued)

(56) References Cited

U.S. PATENT DOCUMENTS

2008/0126675 A1* 5/2008 Fu ....................... G06F 12/1425
711/E12.099
2008/0276059 A1* 11/2008 Horiuchi ................. G06F 21/80
711/E12.091
(Continued)

FOREIGN PATENT DOCUMENTS

DE 102014212420 A1 * 12/2015 ............. G06F 21/62
JP H05216654 A * 8/1993 ............... G06F 9/22
(Continued)

OTHER PUBLICATIONS

Kumar et al., "A Novel Holistic Security Framework for In-Field Firmware Updates," 2018 IEEE International Symposium on Smart Electronic Systems (iSES) (Formerly iNiS), 2018, pp. 261-264, doi: 10.1109/iSES.2018.00063. (Year: 2018).*
(Continued)

*Primary Examiner* — Peter C Shaw
(74) *Attorney, Agent, or Firm* — Foley & Lardner LLP (57) ABSTRACT

A control device of the present embodiment has a communication I/F, a built-in non-volatile memory, a controller, an external-serial-memory I/F, a security management module, and an access controller. The communication I/F enables communication with outside. The built-in non-volatile memory has a first storage region, which stores an initialization program which carries out initialization operation, and a second storage region, which stores currently used firmware which is executed after the initialization operation and acquires firmware for update via the communication I/F. The controller executes the initialization program and the currently used firmware. The external-serial-memory I/F
(Continued)

communicably connects the device of its own to an external non-volatile memory via a serial bus. The security-mode management module fixes an access control setting of the built-in non-volatile memory and the external non-volatile memory. The access controller outputs a level signal different from the serial bus.

16 Claims, 9 Drawing Sheets

(51) Int. Cl.
  *G06F 21/82* (2013.01)
  *G06F 21/62* (2013.01)
(58) Field of Classification Search
  USPC .......................................................... 713/193
  See application file for complete search history.

(56) References Cited

U.S. PATENT DOCUMENTS

| | | | |
|---|---|---|---|
| 2012/0164944 A1 | 6/2012 | Yamaoka et al. | |
| 2017/0032126 A1 | 2/2017 | Koike et al. | |
| 2019/0317774 A1* | 10/2019 | Raghav | G06F 9/4403 |
| 2020/0081708 A1* | 3/2020 | Miyamoto | G06F 9/3877 |
| 2020/0310826 A1* | 10/2020 | Liu | G06F 21/572 |

FOREIGN PATENT DOCUMENTS

| | | | | |
|---|---|---|---|---|
| JP | H06187146 A | * | 7/1994 | ............... G06F 9/22 |
| JP | 2011-150383 A | | 8/2011 | |
| JP | 2011-206151 A | | 10/2011 | |
| JP | 4892652 B1 | | 3/2012 | |
| JP | 2015-018667 A | | 1/2015 | |
| JP | 2015-090694 A | | 5/2015 | |
| JP | 2017-033149 A | | 2/2017 | |
| JP | 2019-145110 A | | 8/2019 | |
| JP | 6678548 B2 | | 4/2020 | |
| RU | 2359317 C2 | * | 6/2009 | |
| WO | WO-2007087918 A1 | * | 8/2007 | ............... G06F 8/65 |
| WO | WO-2013048407 A1 | * | 4/2013 | ........... G06F 11/1415 |
| WO | WO-2013101081 A1 | * | 7/2013 | ............ G06F 21/575 |
| WO | WO-2014001803 A2 | * | 1/2014 | ........... G06F 12/0246 |
| WO | WO-2016020640 A1 | * | 2/2016 | ........... G06F 11/0757 |

OTHER PUBLICATIONS

Jain et al., "Infield firmware update: Challenges and solutions," 2016 International Conference on Communication and Signal Processing (ICCSP), 2016, pp. 1232-1236, doi: 10.1109/ICCSP.2016.7754349. (Year: 2016).*

Huang et al., "Formal Security Verification of Concurrent Firmware in SoCs using Instruction-Level Abstraction for Hardware," 2018 55th ACM/ESDA/IEEE Design Automation Conference (DAC), 2018, pp. 1-6, doi: 10.1109/DAC.2018.8465794. (Year: 2018).*

Schink et al., "Taking a Look into Execute-only Memory," arXiv:1909.05771, 2019, pp. 1-13. (Year: 2019).*

* cited by examiner

|  | Version | SIGNATURE | OPERATION HISTORY | PROTECTION |
|---|---|---|---|---|
| R2 | 2 | Sig[FW2] | – | WP |
| R3 | 1 | Sig[FW1] | + | WP |
| R4 | 2 | Sig[FW2] | – | WE |

FIG.7

|  | Version | SIGNATURE | OPERATION HISTORY | PROTECTION |
|---|---|---|---|---|
| R2 | 2 | Sig[FW2] | + | WP |
| R3 | 1 | Sig[FW1] | + | WP |
| R4 | 2 | Sig[FW2] | + | WE |

FIG.8

|  | Version | SIGNATURE | OPERATION HISTORY | PROTECTION |
|---|---|---|---|---|
| R2 | 0 | Sig[FW0] | + | WP |
| R3 | -1 | — | — | WP |
| R4 | -1 | — | — | WE |

CONTROL DEVICE, INFORMATION PROCESSING DEVICE, AND INFORMATION PROCESSING SYSTEM

CROSS-REFERENCE TO RELATED APPLICATION

This application is based upon and claims the benefit of priority from Japanese Patent Application No. 2021-048890, filed on Mar. 23, 2021; the entire contents of which are incorporated herein by reference.

FIELD

Embodiments described herein relate generally to a control device, an information processing device, and an information processing system.

BACKGROUND

There has been developed a technique that a built-in flash memory (an example of a built-in non-volatile memory), which is built in an information processing device such as a micro control unit (MCU) provided with a program execution function by a central processing unit (CPU) and stores firmware (FW), is configured to have a 2-in-1 2-surface configuration and that combines falsification verification of the FW upon activation of the information processing device and HW access control with respect to the built-in flash memory linked with the falsification verification. By virtue of this, write of FW for update by currently used FW (user FW) stored in the built-in flash memory is enabled. At the same time, in a case of intrusion of malicious software (SW), erasing all of the FW stored in the built-in flash memory is prevented, and a threat of physical access to a chip on a substrate is also eliminated.

However, in the technique in which the built-in flash memory is configured to have a 2-in-1 2-surface configuration, a large-capacity built-in flash memory is required, and it is difficult to apply the technique for a use such as a smart meter which retains a set of plural FW as backup in an external flash memory (example of external non-volatile memory). Particularly, if a storage region of the built-in flash memory only has a size corresponding to one set required for operation of information equipment, when FW for update is to be applied, data corresponding to one set of a program in the built-in flash memory has to be once erased, and the update FW has to be then transferred from an external flash memory into the information processing device. As a prerequisite for this operation, both of FW for rollback, which is for a case in which operation failure has been confirmed in FW for update, and the FW for update has to be retained, and variations are reduced.

DETAILED DESCRIPTION

A control device of the present embodiment has a communication I/F, a built-in non-volatile memory, a controller, an external-serial-memory I/F, a security management module, and an access controller. The communication I/F enables communication with outside. The built-in non-volatile memory has a first storage region, which stores an initialization program which carries out initialization operation, and a second storage region, which stores currently used firmware which is executed after the initialization operation and acquires firmware for update via the communication I/F. The controller executes the initialization program and the currently used firmware. The external-serial-memory I/F communicably connects the device of its own to an external non-volatile memory via a serial bus. The security-mode management module fixes an access control setting of the built-in non-volatile memory and the external non-volatile memory. The access controller outputs a level signal different from the serial bus.

Hereinafter, an example of the control device, an information processing device, and an information processing system according to the present embodiment will be described by using accompanying drawings.

Figure 1:
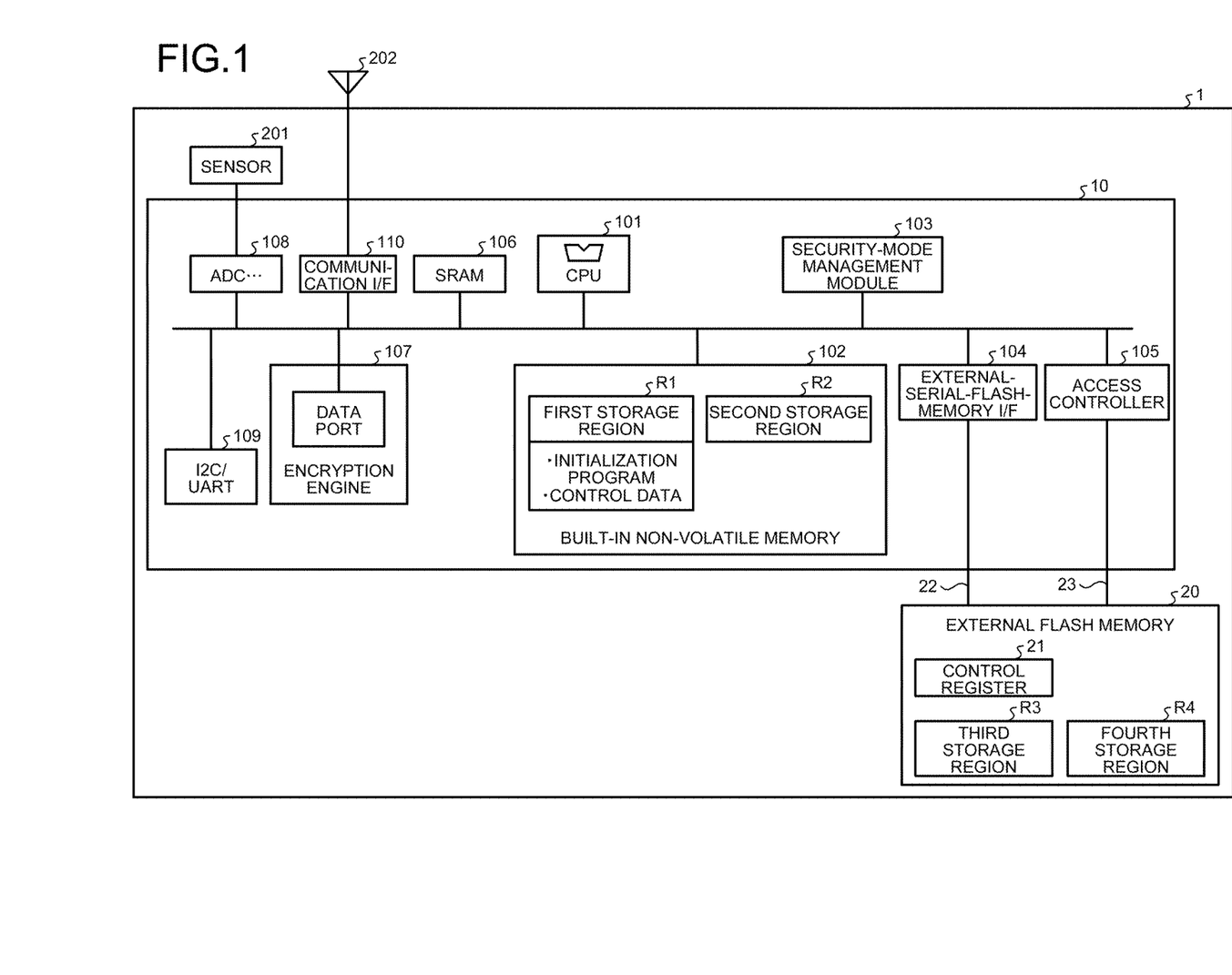
FIG. 1 is a diagram illustrating an example of a configuration of an information processing device according to a present embodiment.

FIG. 1 is a diagram illustrating an example of a configuration of an information processing device according to the present embodiment. As illustrated in FIG. 1, the information processing device according to the present embodiment is a smart meter or the like and has a micro control unit (MCU) 10 (an example of the control device), an external flash memory 20 (an example of an external non-volatile memory), and a sensor 201.

As illustrated in FIG. 1, the MCU 10 according to the present embodiment has: a central processing unit (CPU) 101, a built-in non-volatile memory 102, a security-mode management module 103, an external-serial-flash-memory I/F 104, an access controller 105, a static random access memory (SRAM) 106, an encryption engine 107, an analog to digital converter (ADC) 108, and I2C/UART 109.

The I2C (Inter Integrated Circuit)/UART (Universal Asynchronous Receiver/Transmitter) 109 is used in communication with peripheral equipment by I2C. The ADC 108 converts analog signals to digital signals. The encryption engine 107 encrypts various data transmitted by the I2C/UART 109 to the peripheral equipment. The SRAM 106 is a volatile memory which temporarily stores various data. Also, the MCU 10 is provided with a communication I/F 110, which enables communication between the information processing device 1 and outside via an antenna 202.

The built-in non-volatile memory 102 is an internal flash memory or the like and has a first storage region R1 and a second storage region R2.

The first storage region R1 stores an initialization program, which is a program of an initialization operation executed after the CPU 101 is reset (or power is turned on). Also, the first storage region R1 stores control data. Herein, the control data is, for example, various information such as a FW verification program on an external flash memory which is a firmware (FW) verification program executed upon activation of the information processing device 1 and stored in the external flash memory 20, a signature-verification public key used in verification of FW by the FW verification program on the external flash memory, version information of FW stored in each of a second storage region R2, a third storage region R3, and a fourth storage region R4 described later, and state information indicating a write enabled state with respect to each of the second storage region R2, the third storage region R3, and the fourth storage region R4 described later. The initialization program checks the state of the firmware (FW) stored in the later-described second storage region R2 and the third and fourth storage regions R3 and R4 based on the above described control data and sets, in order to store FW for update, access control settings in a control register 21 so that write is disabled in the region required for rollback in the third and fourth storage region of the external flash memory 20 and write is enabled in the region for acquiring FW for update. Furthermore, this access control state is fixed so that the access control settings are not changed in execution of FW carried out after the initialization program. As a result of fixing the access control state, an output which prohibits the access controller 105 from changing the setting of the control register 21 of the external flash memory 20 is output to the level signal. Details will be described later.

The second storage region R2 stores FW which is executed after the initialization operation by the initialization program and acquires the FW for update via the communication I/F 110. In other words, the FW stored in the second storage region R2 is the currently used FW. The data access (including execution of programs) with respect to the second storage region R2, which is connected to the CPU 101 by a bus in a chip, is faster compared with the access to the serially-connected third or fourth storage region R3 or R4 of the external flash memory 20, and the FW stored in the second storage region R2 is used as a main-function program (FW), which carries out communication and data acquisition. The currently used FW carries out measurement by a sensor, which is a main function of the information processing device 1, transmission/reception of data to/from outside via communication, and acquisition of the FW for update, which is also carried out via communication, and saving of the FW with respect to the external flash memory 20. As described above, the authority to carry out write with respect to the second storage region R2 is not given to the FW, and the writable non-volatile memory region is limited to the storage region of the external flash memory 20 set by the initialization program to enable write. A reason for this is to limit the range of destruction of programs or data and preserve the main function of the FW and the programs and data necessary for re-executing update of the FW after reactivation is carried out even in a case in which vulnerability of the FW is attacked via communication and a malicious program is executed as a result since software which carries out communication can easily include vulnerability which raises concern for execution of a malicious program via the communication.

The CPU 101 is an example of a controller which executes various programs such as an initialization program stored in the first storage region R1 and the second storage region R2 of the built-in non-volatile memory 102. The external-serial-flash-memory I/F 104 connects the MCU 10 and the external flash memory 20 via a serial bus 22 so that communication can be carried out therebetween. The external flash memory 20 at least has logically-divided storage regions corresponding to the above described third and fourth storage regions R3 and R4. Also, the external flash memory 20 has the control register 21, which stores the access control setting (enable setting or disable (prohibit) setting) which controls write of each of the third and fourth storage regions, and write of the setting with respect to the control register 21 is carried out via the serial bus 22. Then, the access controller 105 outputs the level signal through a bus (an example of a path) 23 different from the serial bus 22. The access controller 105 outputs the level signal, which fixes the access control setting of the control register 21, to the external flash memory 20. While this input is active, a write operation with respect to the control register 21 via the serial bus 22 is ignored by a hardware logic built in the external flash memory 20. The level signal is connected to the access controller 105 of the MCU 10. When the security-mode management module 103 is subjected to fixing of the access control setting after the access control setting with respect to the control register 21 is completed, thereafter, write is prohibited with respect to the whole built-in non-volatile memory 102, the output of the level signal of the access controller 105 becomes active at the same time, and the initialization program cannot change the access control setting of the control register 21 while the currently used FW, which is stored in the second storage region R2 and executed thereafter, is executed. The security-mode management module 103 is a module which manages security of the built-in non-volatile memory 102 and the external flash memory. Note that, in read/write of the external-serial-flash-memory I/F 104 in the MCU 10 side, a style of writing a packet called a command including an address of an access destination to an internal register of the external-serial-flash-memory I/F 104 by software to process a read/write request is the simplest. In a case of such an access style, the memory regions (the third and fourth storage regions and the control register 21) of the external flash memory 20 cannot be directly seen from an address space in the MCU 10, but all of the memory regions are seen as one command register. Therefore, access to the storage regions in the external flash memory 20 cannot be restricted only by the address range in a memory map in the MCU 10. The above described fixation of the access control setting by the level signal enables access control also in the external-serial-flash-memory I/F 104, which is simple. However, a FW management method of the present embodiment described below can be applied also in the access control based on the address range of the memory map in the MCU 10, which requires larger-scale HW.

Figure 2:
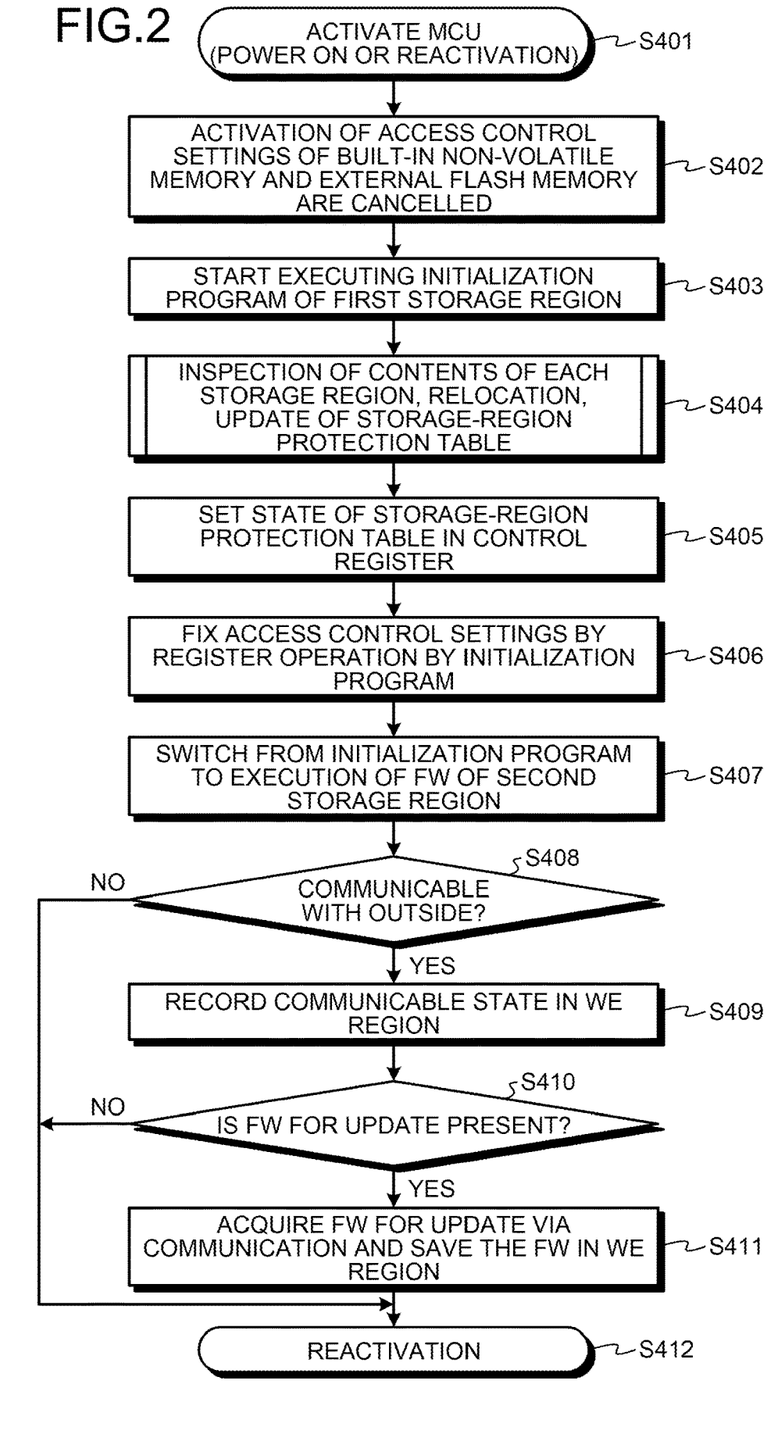
FIG. 2 is a diagram illustrating an outline operation of the MCU according to the present embodiment and describing HW operation, initialization program operation, and operation of FW together.

FIG. 2 is a diagram illustrating an outline operation of the MCU according to the present embodiment and describing HW operation, initialization program operation, and operation of FW together. Before execution of a program by the CPU 101 after power-on or reset (reactivation) of the MCU 10 (step S401), the security-mode management module 103 cancels all the access control settings (step S402). Upon start of program execution, the CPU 101 starts execution of the initialization program in a state in which all operations by execution of programs are allowed (step S403). By operating the initialization program, the CPU 101 carries out verification of completeness (inspection of contents of each storage region, relocation, update of a storage-region protection table, etc.) based on the above described control data with respect to the second storage region R2 of the built-in non-volatile memory 102 and each storage region of the external flash memory 20 (step S404). Based on the results thereof, the CPU 101 sets an access control setting which is applied upon execution of the FW (step S405) and fixes the access control setting (step S406). Regarding the built-in non-volatile memory 102, the access control setting is not applied at the point when the access control setting is carried out, but the access control setting is applied only after the initialization program fixes the access control setting in the security-mode management module 103. When the initialization program carries out fixation of the access control setting with respect to the security-mode management module 103, the access controller 105 is activated by an internal hardware signal, the output of the level signal 23 is changed from inactive to active, write to the control register 21 of the external flash memory 20 is prohibited, the access control setting is fixed, and execution is switched from the initialization program to the FW (step S407). Once the access control setting is fixed, then, a hardware circuit of the security-mode management module 103, the built-in non-volatile memory 102, and the access controller 105 is formed so that the fixation of the access control setting cannot be cancelled until reset of the CPU 101 is executed and the initialization program is executed.

By virtue of the above described mechanism, the currently used FW and the FW for rollback stored in the built-in non-volatile memory 102 and the external flash memory 20 can be prevented from being erased or falsified by erroneous operation (including malicious operation by a maliciously executed program caused by software vulnerability) of the currently used FW stored in the built-in non-volatile memory 102 after the access control setting of the security-mode management module 103 is activated after the access control setting by the initialization operation of the initialization program.

As illustrated in FIG. 1, the external flash memory 20 according to the present embodiment has the third storage region R3, the fourth storage region R4, and the control register 21. The third storage region R3 and the fourth storage region R4 can store FW (old version FW), which is for backup of the FW stored in the second storage region R2, and FW (new version FW) for update. The control register 21 stores the access control setting of each of the third storage region R3 and the fourth storage region R4. The setting information of each storage region is determined based on the storage-region protection table described later, and the access control setting is set.

In the information processing device 1 having such a configuration, in order to prevent falsification of the FW of the second storage region R2, the initialization program prohibits all the write with respect to the second storage region R2, which stores the currently used FW, sets write enable of the update FW for either one of the storage regions (the third storage region R3 or the fourth storage region R4) of the external flash memory 20, and fixes the access control setting. Then, the initialization program executes the currently used FW stored in the second storage region R2 (step S407).

The currently used FW determines a communicable state, for example, by communication through the communication I/F 110 and records the communicable state in a WE region (the storage region in which write is enabled in the third and fourth storage regions of the external flash memory 20) (step S408: Yes, step S409). The currently used FW acquires the FW for update from outside and saves the FW in the write-enabled WE region of the external flash memory 20 (step S410: Yes, step S411). Also, a digital signature for verifying the completeness and version number of the acquired FW is also saved in the same region. If communication cannot be carried out or if activation cannot be carried out in the first place due to failure or the like of the FW (step S408: No), reactivation is carried out without carrying out the recording (step S412).

After acquisition of the FW for update, the currently used FW avoids the time that adversely affects the main function such as measurement to carry out reactivation (step S412). As described above, the fixation of the access control setting is cancelled (step S402) by the reactivation, and execution of the initialization program is started in a state in which all the access control setting is cancelled (step S403).

Figure 3A:
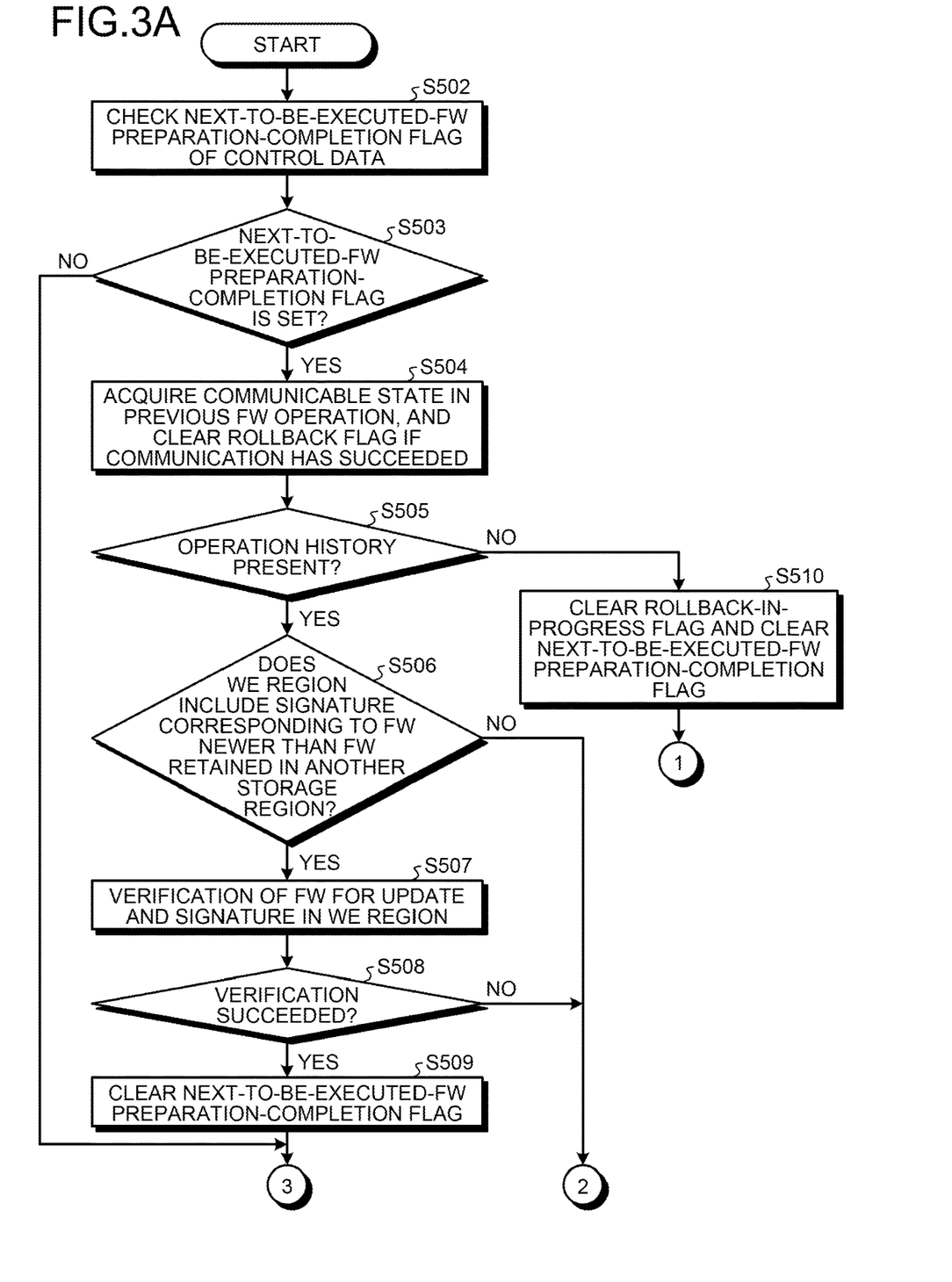
FIG. 3A is a flow chart describing detailed operations of inspection and relocation of the contents of storage regions by an initialization program of the information processing device according to the present embodiment.
Figure 3B:
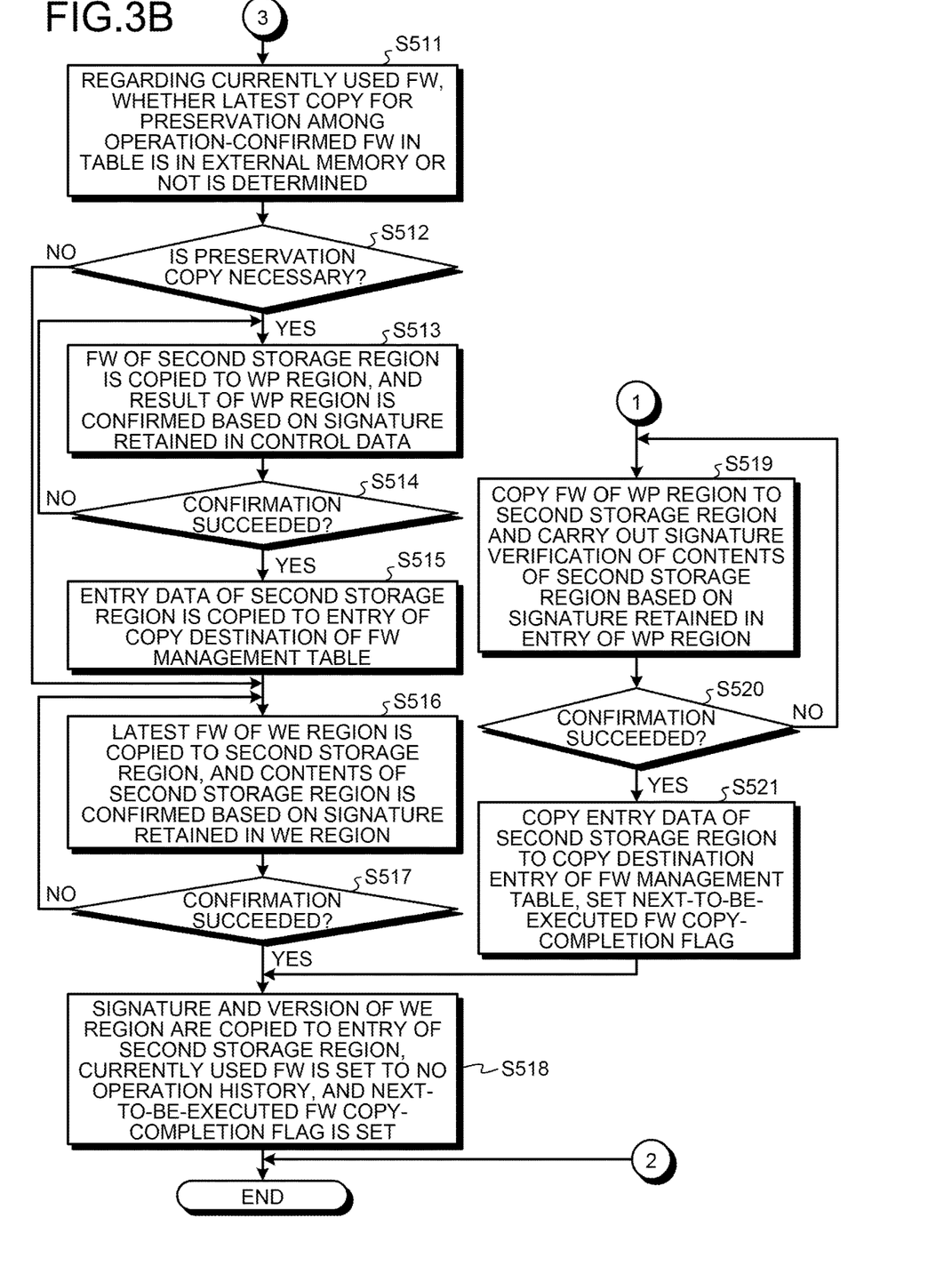
FIG. 3B is a flow chart describing detailed operations of inspection and relocation of the contents of storage regions by the initialization program of the information processing device according to the present embodiment.
Figure 4:
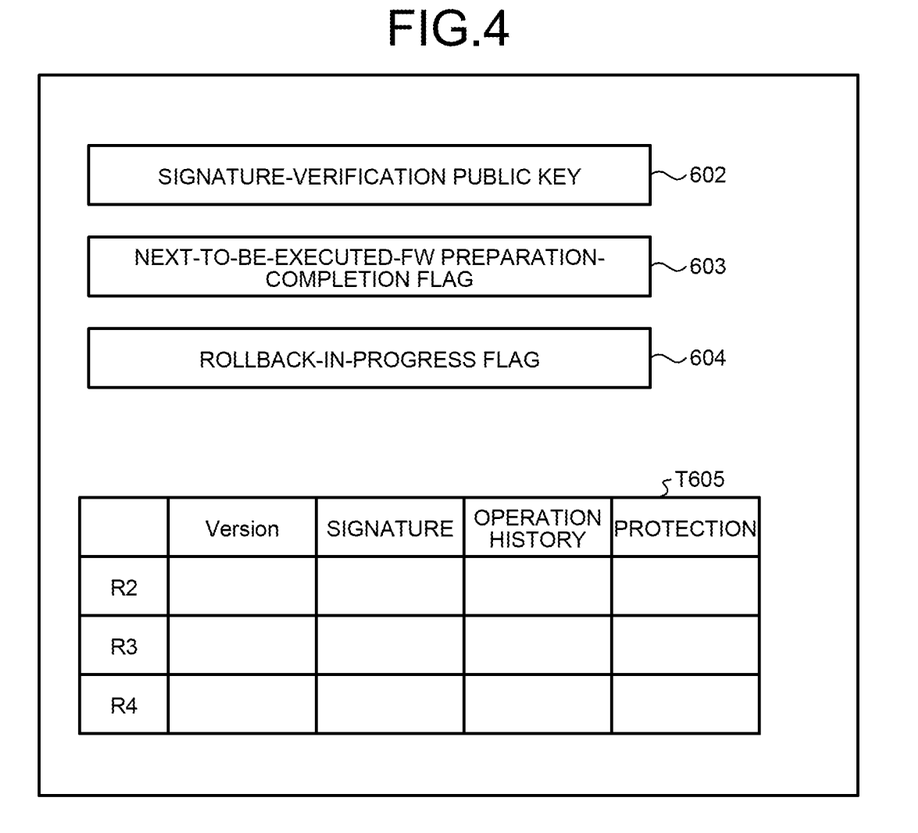
FIG. 4 is a diagram illustrating details of the control data of the information processing device according to the present embodiment.

FIG. 3A and FIG. 3B are flow charts describing detailed operations of the inspection and relocation of the contents of the storage regions by the initialization program of the information processing device according to the present embodiment. FIG. 4 is a diagram illustrating details of the control data of the information processing device according to the present embodiment. FIGS. 5 to 8 are diagrams for describing examples of changes in the storage-region protection table of the information processing device according to the present embodiment. The initialization program is capable of recognizing the storage region of the FW for update in the previous execution of the FW (herein, described as the WE region, which means it has been writable in the previous time) by referencing a storage-region management table T605 of the control data illustrated in FIG. 4.

The control data includes a signature-verification public key 602 for FW signature verification, a next-to-be-executed-FW preparation-completion flag 603, a rollback-in-progress flag 604, and a storage-region protection table T605. In a state of the storage-region protection table T605 illustrated in FIG. 5, FW having a version number (Version): 1 is stored in the second storage region R2, and it is in a previously executed state. In the second storage region R2 of the storage-region management table T605, the version number (Version): 1, a signature of FW, an operation history of the FW, and a protection field are recorded. The operation history "+" of FW means that it has been communicable with outside by using the FW. The protection field means either a write enabled or disabled state during execution of the FW, wherein WP represents write prohibition, and WE represents write enable. The next-to-be-executed-FW preparation-completion flag 603 is a flag for managing a transitional state during execution of a change operation of the storage region. In a state in which the next-to-be-executed-FW preparation-completion flag 603 is set, in the contents of the storage region in which the protection field is WP in the entry corresponding to the storage region, the version and the signature of the FW of the storage region of each protection field match. On the other hand, in the contents of the storage region in which the protection field is WE, as a result of carrying out write of the FW for update by operation of the FW, the signature retained in an entry of the storage-region management table T605 before the write may not match the actual state of the FW retained in the storage region in some cases. The signature-verification public key 602 is a public key used for signature verification of the FW of each storage region. The rollback-in-progress flag 604 is a flag which indicates that rollback of the FW is in progress.

Figure 5:
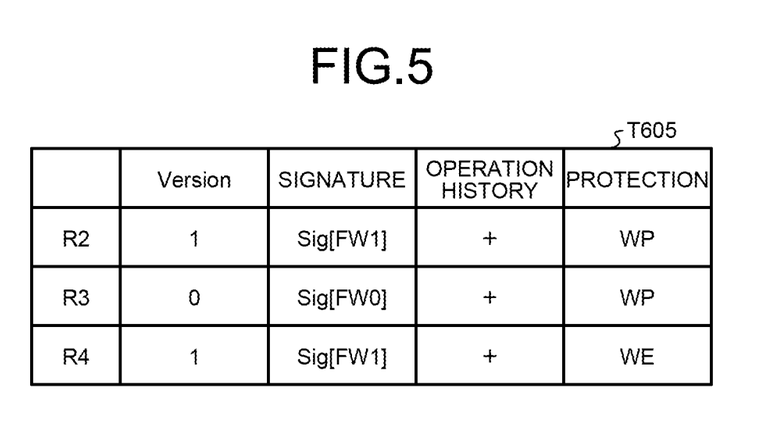
FIG. 5 is a diagram for describing an example of changes in a storage-region protection table of the information processing device according to the present embodiment.

Hereinafter, with reference to FIG. 3A and FIG. 3B, details of an inspection and a relocation process (step S404 of FIG. 4) of the contents of each storage region by the initialization program in a normal activation process in which FW for update is not acquired in the state that matches the storage-region protection table T605 of FIG. 5 will be described. The state of the storage-region protection table T605 at the point of time when execution is started is illustrated in FIG. 5.

First, in step S502, the initialization program checks the state of the next-to-be-executed-FW preparation-completion flag 603. This is provided in order to carry out a retry in a state in which failure such as power discontinuity has occurred during copying of the FW for update and a process has been interrupted. If there is no failure, the next-to-be-executed-FW preparation-completion flag 603 is in a set state (step S503: Yes). Next, the initialization program acquires, from a predetermined address of the WP region, the communicable state of the point when the FW has been operated previously (step S504). This is the information recorded in step S411 when the FW has been operated previously, and it is assumed in this case that communication has been normally carried out (step S505: Yes). Furthermore, a fact that the operation history of the second storage region R2, which includes the previously operated FW, is "+" is checked by referencing the table T605 (step S505: Yes). Next, the initialization program checks whether the signature of the FW for update acquired by the currently used FW is present or not in the WE region in the previous execution (step S506). In this case, since there is no FW for update, relocation is not required, the process proceeds to step S523, and the process corresponding to step S404 is completed. In step S405 after step S404 is finished, the initialization program sets access control settings in accordance with the designation of write prohibition: WP or write enable: WE in each entry of the storage-region protection table T605 (step S405) and fixes the access control settings (step S406), and the same FW1 as the previous activation is executed (step S407).

Hereinafter, operation of a case in which acquisition of FW2 for update succeeds in execution of next currently used FW1, wherein FW2 having a version number: 2 and a signature Sig[FW2] are written to the WE region (fourth storage region R4) will be described. Detailed operation of this case will be described. The state of the storage-region protection table T605 at the point when execution of the currently used FW1 is started is illustrated in FIG. 5. First, the initialization program checks the state of the next-to-be-executed-FW preparation-completion flag 603 in step S502 and checks whether it has been communicable or not in step S504 and step S505. In step S506 to S508, the initialization program confirms, by digital signature verification using a signature public key 606, that FW2 of the acquired version number: 2 is a newer version compared with FW0 and FW1 listed in the storage-region protection table T605, that the version number is correct, and that FW2 does not include falsification. The FW for update which has succeeded in the signature verification and has been confirmed to have a newer version number than the currently used FW becomes second-generation FW, which is to be executed next. When the verification and recency confirmation of the FW for update succeeds, the next-to-be-executed-FW preparation-completion flag 603 is cleared, a fact that a copy operation of FW is necessary is indicated (step S509).

As preparation before copying the FW2 for update to the second storage region R2, in step S511 and step S512, the initialization program confirms (determines) that the FW1 currently retained in the second storage region R2 is the latest among the FW which has already been confirmed to have been operated and that a copy for preservation is not present in the external flash memory 20. If both of the conditions are satisfied, the initialization program executes a preservation operation (step S513 to S515) of copying the FW stored in the second storage region R2 to the external flash memory 20. In step S513, the initialization program copies the contents of the second storage region R2 to the third storage region R3 as the storage region retaining FW0 older than FW1 as a copy destination. After the copy operation to the third storage region R3 is completed, the initialization program verifies contents based on the signature of the FW1 stored in the storage-region protection table T605 and, if the copy is normally completed, copies the entry of the storage-region protection table T605 corresponding to the second storage region R2 to the entry of the storage-region protection table T605 of the third storage region R3 (step S515). Even when power discontinuity occurs during execution of the copy, this operation is repeatedly carried out until the copy from the second storage region R2 to the third storage region R3 and the signature verification is normally completed since the next-to-be-executed-FW preparation-completion flag 603 has been cleared. The update of the storage-region management table T605 is carried out only after the signature verification of the third storage region R3 is normally completed. Also in a case in which the update of the storage-region protection table T605 fails due to power discontinuity, a retry is similarly carried out.

After the preservation of the FW1 of the second storage region R2 is completed, a preparation process of copying the FW2 for update stored in the fourth storage region R4 to the second storage region R2 of the built-in non-volatile memory 102 to make it executable is carried out in steps S516 to S518. It has been confirmed in steps S506 to S508 that the signature-verified latest FW2 is stored in the fourth storage region R4, which is WE in the storage-region management table T605. In step S516, the initialization program copies the FW of the fourth storage region R4 to the second storage region R2 and carries out verification and confirmation of the FW2 copied to the second storage region R2 based on the signature retained in the fourth storage region R4 (step S516). A retry is carried out until the confirmation succeeds (step S517). When the confirmation succeeds, the initialization program carries out recency check of the version number again regarding the FW for update in the WE region and then copies the version number and the signature to the second storage region R2 of the storage-region protection table T605. Also, regarding the FW2 for update, the initialization program sets no operation history (−) as the operation history and sets write prohibited: WP as protection.

Figure 6:
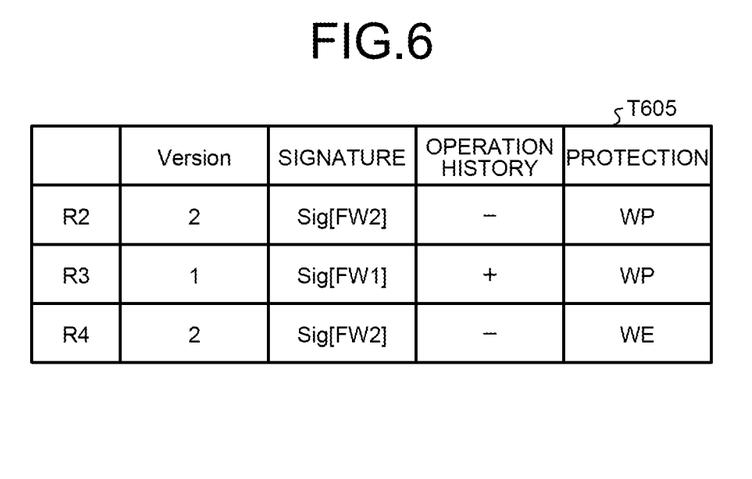
FIG. 6 is a diagram for describing an example of changes in the storage-region protection table of the information processing device according to the present embodiment.

Furthermore, the version, the signature, and the operation history of the second storage region R2 are copied to the entry of the storage-region protection table T605 corresponding to the fourth storage region R4, which is a copy source, and then, the protection is set to write enabled: WE. After these processes are completed, the initialization program sets the next-to-be-executed-FW preparation-completion flag 603 (step S518). The contents of a FW update table in this state are illustrated in FIG. 6. Thereafter, in step S405, access control settings following the protection of the storage-region protection table T605 are implemented in step S405, and the access control settings are fixed in step S406. The detailed process in the case in which FW is updated has been described above.

Figure 7:
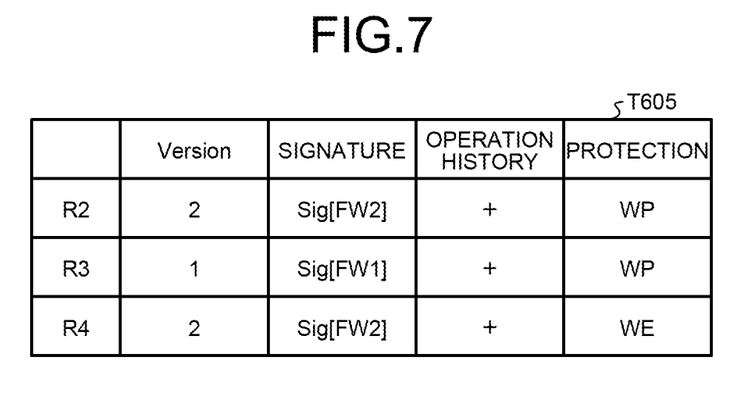
FIG. 7 is a diagram for describing an example of changes in the storage-region protection table of the information processing device according to the present embodiment.
Figure 8:
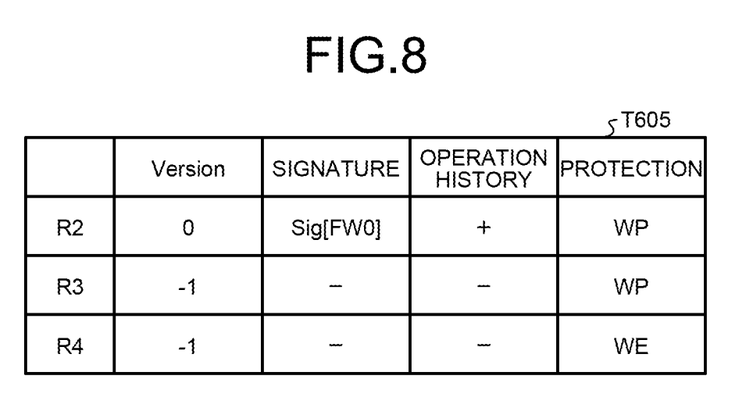
FIG. 8 is a diagram for describing an example of changes in the storage-region protection table of the information processing device according to the present embodiment.

After step S407, the updated FW2 is executed. Serious failure that can occur upon update of FW includes incapability of activation and communication. If the FW2 is communicable, a fact that it is communicable is recorded at a predetermined address in the WE region in step S409. This information is checked in the step of step S504 during execution of the initialization program in the reactivation of the next time, and, if it is communicable, this information is reflected to the field of the operation history of the second storage region R2 in the storage-region protection table T605. FIG. 7 illustrates the contents of the storage-region management table T605 to which the operation history of the case in which the FW2 has succeeded in operating has been reflected.

If a record indicating that FW with no operation history has been communicable is not detected, failure is expected in the FW for update, and check is carried out in S505. In a case in which the update FW is executed for the first time like the above description, it is assumed to have no operation history (step S518 and FIG. 6). If there is no successful communication record after the update FW is once operated, the operation history remains as "–" in step S504, and the control is transferred in S505 to S510 (determined that there is no operation history (step S505: No)). The initialization program carries out rollback to the FW which has an operation history, sets the rollback-in-progress flag 604, and clears the next-to-be-executed-FW preparation-completion flag (step S510). If the FW for update which has no operation history has been executed, it means FW having an operation history has been copied for preservation in the past (step S511). In the rollback, a preservation process of the FW which does not operate is not required, and it is only required to copy the FW having an operation history in the external flash memory 20 to the second storage region R2 and execute the FW. The initialization program sets the rollback-in-progress flag 604, which indicates that the FW other than the latest FW is to be executed, and clears the next-to-be-executed-FW preparation-completion flag 603 for managing the copy state. Most part of the processes of step S519 to step S521 is the same as the case of update (steps S516 to S518). However, the rollback case is different in a point that the contents of the copy source entry of the storage-region protection table T605 are copied to the second storage region R2 together with the field of the operation history (step S521).

In the method in which the built-in non-volatile memory 102 of the MCU 10 of the present embodiment and the external flash memory 20 are used in combination, regarding HW cost, a cost reduction effect is obtained when the cost reduction that comes from the area reduction of the MCU 10 is larger than the cost increase that comes from increase in the number of chips as a result of using the external flash memory 20 having low bit cost. On the other hand, from a viewpoint of labor steps in device manufacturing, if it is required to carry out write to both of the built-in non-volatile memory 102 of the MCU 10 and the external flash memory 20, this is a factor of cost increase. For the operation of the initialization program which has already been described, the data of the external flash memory 20 is not required to be written in advance as long as control data and FW0, which is shipment FW, is written only in the built-in non-volatile memory 102 of the MCU 10, and increase in labor steps of device manufacturing, which is concerned when the external flash memory 20 is used, can be avoided.

In device manufacturing, FW0 which is initial shipment FW is written in the second storage region R2 of the built-in non-volatile memory 102. In the storage-region protection table T605, the contents illustrated in FIG. 8 that only the second storage region R2 has a history of FW0 are written upon initialization of the MCU 10. Similarly, the signature-verification public key 602 is also written in advance. The next-to-be-executed-FW preparation-completion flag 603 is set, and a cleared state of the rollback-in-progress flag 604 is written. The external flash memory 20 is built in each device in a blank state with nothing written. When the device operates in this state, the operation up to step S403 is carried out normally. The next-to-be-executed-FW preparation-completion flag 603 is set in step S503, and presence of an operation history is set in the check of step S505. Therefore, the process proceeds to step S506. The external flash memory 20 is in a blank state, and FW for update and a signature do not exist. Therefore, after step S523, the step of step S404 is finished. The initialization program carries out access control setting in accordance with the protection corresponding to each storage region of the storage-region protection table T605 (step S406), fixes the access control setting (step S407), and executes the FW0 of the second storage region R2. Then, when the FW0 operates and FW for update is acquired via communication, the FW0 is preserved in the third storage region R3 by the next operation of the initialization program, and the state illustrated in FIG. 5 is obtained as a result. In this manner, by carrying out normal operation in the state in which the FW0 for initial shipment is written only in the built-in non-volatile memory 102 of the MCU 10 without writing to the external flash memory 20, the state in which both of the FW1, which is currently used FW, and the FW0 for rollback is retained can be realized, and this can be realized only by providing a slight additional step to the normal FW update function.

The present embodiment is provided with an access control function that once copies the contents of the built-in non-volatile memory 102 to an unnecessary storage region of the external flash memory 20 upon update of FW for the sake of preservation, copies the FW for update to the built-in non-volatile memory 102, and configures that the setting cannot be changed upon execution of the FW when the FW for update is acquired in the writable region of the external flash memory 20 by the operation of the main function of FW by the combination of the MCU 10 having the built-in non-volatile memory 102, which only stores the FW of the main function corresponding to one set, and the external flash memory 20. By virtue of this, in the MCU 10 having the built-in non-volatile memory 102 only for storing the FW of the main function corresponding to one set, destruction of the FW for rollback can be reliably prevented. In addition, even in a case in which FW for initial shipment upon device manufacturing is written only in the MCU 10, an effect of reducing the labor of writing to the external flash memory 20 upon equipment manufacturing can be obtained by preserving the FW for update, which is for rollback, in the external flash memory 20.

Figure 9:
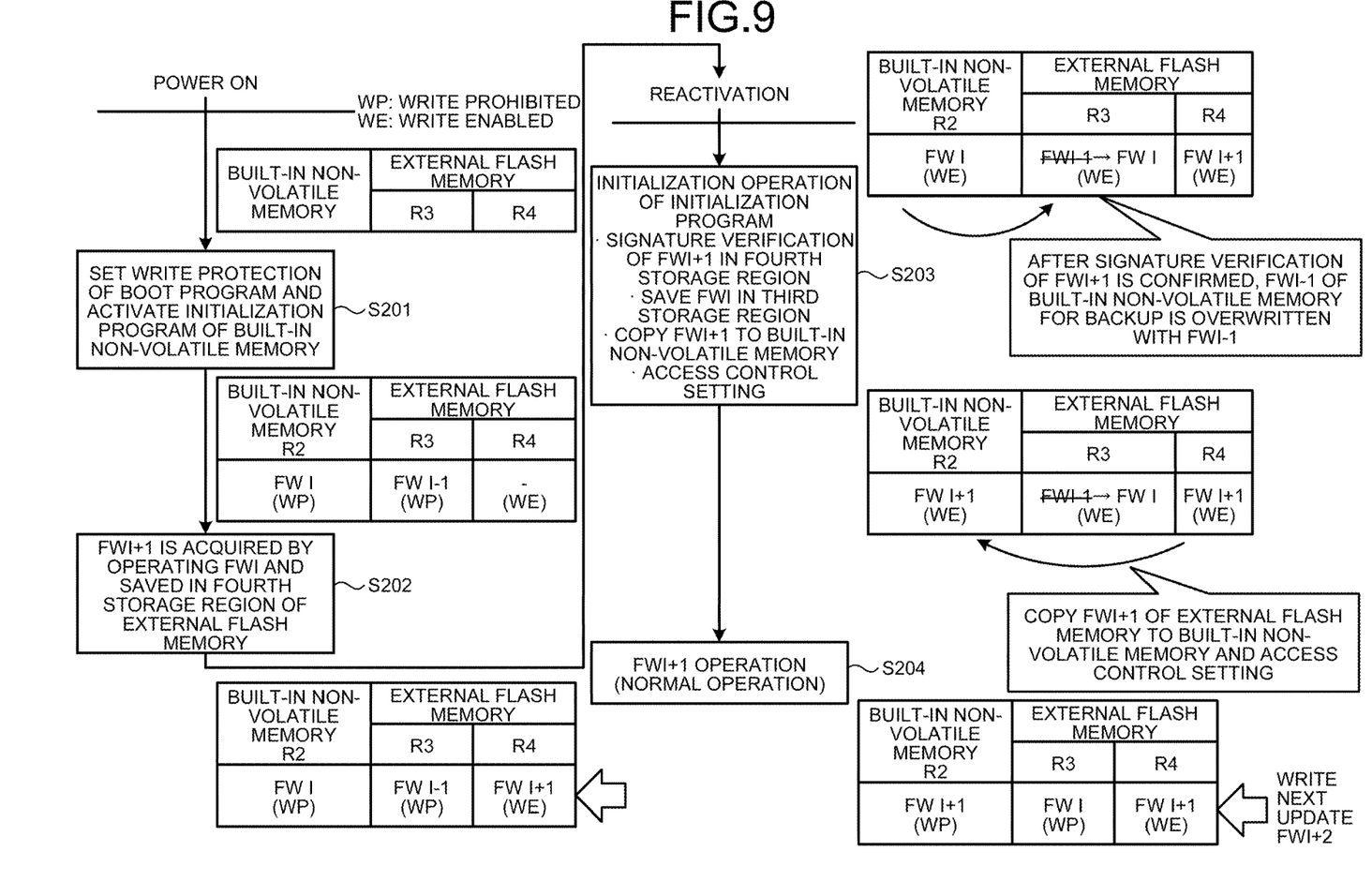
FIG. 9 is a flow chart illustrating an example of a flow of an update process of firmware in the information processing device according to the present embodiment.

FIG. 9 is a flow chart illustrating an example of a flow of an update process of firmware in the information processing device according to the present embodiment. Next, an example of the flow of the update process of the FW in the information processing device according to the present embodiment will be described by using FIG. 9.

When power of the MCU 10 is turned on, the CPU 101 executes a boot program stored in the first storage region R1 of the built-in non-volatile memory 102 and sets write protection which prohibits write to the second storage region R2 of the built-in non-volatile memory 102 and the third storage region R3 of the external flash memory 20 (step S201). Furthermore, the boot program activates the initialization program stored in the first storage region R1 of the built-in non-volatile memory 102 (step S201).

Next, after the initialization operation by the initialization program, FWI+1 for update is acquired by operating FWI and is saved in the fourth storage region R4 of the external flash memory 20, and the MCU 10 is reactivated (step S202).

When the MCU 10 is reactivated, the CPU 101 executes the initialization program stored in the first storage region R1 of the built-in non-volatile memory 102. The initialization program executes signature verification of the FWI+1 for update, which is stored in the fourth storage region R4 of the external flash memory 20, by an initialization operation (step S203). When the FWI+1 for update is confirmed to be valid, the initialization program saves the currently used FWI, which is stored in the second storage region R2, in the third storage region R3 of the external flash memory 20 and then writes the FWI+1 for update to the second storage region R2 of the built-in non-volatile memory 102 (step S203).

Furthermore, the initialization program sets an access control setting that prohibits write of FW with respect to the second storage region R2 and the third storage region R3 and sets an access control setting that enables write of FWI+2 for update with respect to the fourth storage region R4 (step S204). Also, the access control settings with respect to the second storage region R2, the third storage region R3, and the fourth storage region R4 are fixed (activated) by the security-mode management module 103. Then, the CPU 101 executes the FWI+1 stored in the second storage region R2 of the built-in non-volatile memory 102 (step S204).

Figure 10:
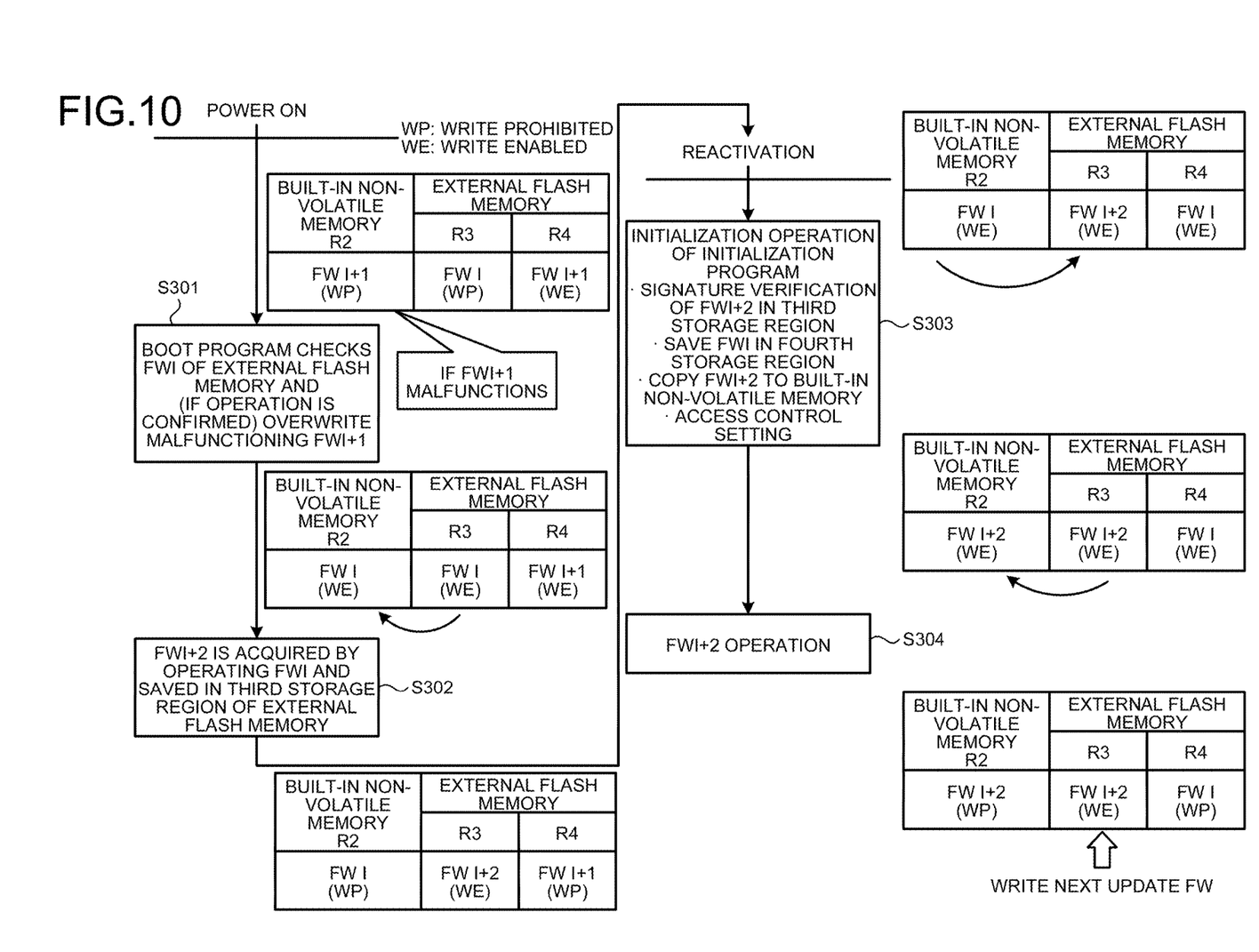
FIG. 10 is a flow chart illustrating an example of a flow of a rollback process of firmware in the information processing device according to the present embodiment.

FIG. 10 is a flow chart illustrating an example of a flow of a rollback process of firmware in the information processing device according to the present embodiment. An example will be described by using FIG. 10.

When power of the MCU 10 is turned on, the CPU 101 executes the boot program stored in the first storage region R1 of the built-in non-volatile memory 102 (step S301). The boot program checks operation of FWI+1 stored in the second storage region R2 of the built-in non-volatile memory 102. If the FWI+1 malfunctions, the boot program checks operation of the old version FWI stored in the third storage region R3 of the external flash memory 20 and overwrites the FW: I with FWI+1 stored in the second storage region R2 (step S301).

Next, the CPU 101 executes the FWI stored in the second storage region R2, acquires FWI+2 for update by operating the FWI, writes the acquired FWI+2 for update to the third storage region R3 of the currently used FWI among the third storage region R3 and the fourth storage region R4, and reactivates the MCU 10 (step S302).

When the MCU 10 is reactivated, the CPU 101 executes the initialization program stored in the first storage region R1 of the built-in non-volatile memory 102 and executes signature verification of the FWI+2 for update, which is stored in the third storage region R3 of the external flash memory 20, by a FW verification program in the external flash memory 20 (step S303). When the FWI+2 for update is confirmed to be valid, the initialization program saves the currently used FWI, which is stored in the second storage region R2, in the fourth storage region R4 of the external flash memory 20 and then writes the FWI+2 for update, which is stored in the third storage region R3, to the second storage region R2 of the built-in non-volatile memory 102 (step S303).

Furthermore, the initialization program sets an access control setting that prohibits write of FW with respect to the second storage region R2 and the fourth storage region R4 and sets an access control setting that enables write of FW for update with respect to the third storage region R3 (step S303). Also, the access control settings with respect to the second storage region R2, the third storage region R3, and the fourth storage region R4 are fixed by the security-mode management module 103. Then, the CPU 101 executes the FWI+2 stored in the second storage region R2 of the built-in non-volatile memory 102 (step S304).

In this manner, according to the information processing device 1 according to the present embodiment, since the FW for rollback of the currently used FW stored in the second storage region R2 remains in the external flash memory 20, variations of the FW for rollback in the case in which malfunction of the FW for update written in the fourth storage region R4 is confirmed can be increased. Also, the necessity of the built-in non-volatile memory 102 having a large capacity is eliminated, the necessity of retaining a set of plural FW for backup in the external flash memory 20 is eliminated, and the information processing device 1 can be employed for a use such as a smart meter.

The present embodiment is provided with an access control function that once copies the contents of the built-in non-volatile memory 102 to an unnecessary storage region of the external flash memory 20 upon update of FW for the sake of preservation, copies the FW for update to the built-in non-volatile memory 102, and configures that the setting cannot be changed upon execution of the FW when the FW for update is acquired in the writable region of the external flash memory 20 by the operation of the main function of FW by the combination of the MCU 10 having the built-in non-volatile memory 102, which only stores the FW of the main function corresponding to one set, and the external flash memory 20. By virtue of this, in the MCU 10 having the built-in non-volatile memory 102 only for storing the FW of the main function corresponding to one set, destruction of the FW for rollback can be reliably prevented. In addition, even in a case in which initial FW upon device manufacturing is written only in the MCU 10, an effect of reducing the labor of writing to the external flash memory 20 upon equipment manufacturing can be obtained by preserving the FW for update, which is for rollback, in the external flash memory 20.

What is claimed is:

1. A control device comprising:
   a communication I/F that enables communication with outside;
   a built-in non-volatile memory having a first storage region and a second storage region, the first storage region storing an initialization program for carrying out an initialization operation, the second storage region storing currently used firmware that is executed after the initialization operation and acquires firmware for update via the communication I/F;
   a controller that executes the initialization program and the currently used firmware;
   an external-serial-memory I/F that communicably connects the device of its own to an external non-volatile memory via a serial bus; and wherein the external non-volatile memory is provided with a third storage region, a fourth storage region, and a control register that stores the access control setting applied to the second storage region, the third storage region, and the fourth storage region upon execution of the firmware;
a security-mode management module that fixes an access control setting of the built-in non-volatile memory and the external non-volatile memory; and
an access controller that outputs a level signal via a path different from the serial bus; and
wherein the currently used firmware writes the firmware for update to the storage region in which write of the firmware is enabled by the access control setting among the third storage region and the fourth storage region.

2. The device according to claim 1, wherein,
in the initialization operation, the initialization program sets the access control setting that prohibits write of the firmware with respect to the second storage region, sets the access control setting that enables write of the firmware with respect to either one storage region of the third storage region and the fourth storage region, and sets the access control setting that prohibits write of the firmware with respect to the other one of the storage regions.

3. The device according to claim 1, wherein the security-mode management module fixes the access control setting after the initialization operation and configures so that the fixation of the access control setting cannot be cancelled until the initialization program is executed after next power-on or reset of the control device.

4. The device according to claim 1, wherein,
when the access control setting of the built-in non-volatile memory and the external non-volatile memory is fixed by the security-mode management module by operation of the initialization program, the access controller prohibits write with respect to the control register.

5. The device according to claim 1, wherein
when the firmware for update is stored in the third storage region or the fourth storage region, the initialization program further copies the currently used firmware stored in the second storage region to the storage region that stores the firmware that is old among the third storage region and the fourth storage region and then copies the firmware for update to the second storage region.

6. The device according to claim 5, wherein,
when the firmware for update having no operation history cannot communicate with outside via the communication I/F, the initialization program further copies the currently used firmware stored in the third storage region or the fourth storage region to the second storage region.

7. An information processing device comprising a control device and an external non-volatile memory; wherein
the control device is provided with:
a communication I/F that enables communication of the information processing device with outside,
a built-in non-volatile memory having a first storage region and a second storage region, the first storage region storing an initialization program that carries out initialization operation of the control device, the second storage region storing currently used firmware that is executed after the initialization operation and acquires firmware for update via the communication I/F,
a controller that executes the initialization program and the currently used firmware,
an external-serial-memory I/F that communicably connects the control device and the external non-volatile memory via a serial bus,
a security-mode management module that fixes an access control setting of the built-in non-volatile memory and the external non-volatile memory, and
an access controller that outputs a level signal different from the serial bus; and
the external non-volatile memory is provided with:
a third storage region,
a fourth storage region, and
a control register that stores the access control setting applied to the second storage region, the third storage region, and the fourth storage region upon execution of the firmware, wherein the currently used firmware writes the firmware for update to the storage region in which write of the firmware is enabled by the access control setting among the third storage region and the fourth storage region.

8. The device according to claim 7, wherein,
in the initialization operation, the initialization program sets the access control setting that prohibits write of the firmware with respect to the second storage region, sets the access control setting that enables write of the firmware with respect to either one storage region of the third storage region and the fourth storage region, and sets the access control setting that prohibits write of the firmware with respect to the other one of the storage regions.

9. The device according to claim 7, wherein the security-mode management module fixes the access control setting after the initialization operation and configures so that the fixation of the access control setting cannot be cancelled until the initialization program is executed after next power-on or reset of the control device.

10. The device according to claim 7, wherein,
when the access control setting of the built-in non-volatile memory and the external non-volatile memory is fixed by the security-mode management module by operation of the initialization program, the access controller prohibits write with respect to the control register.

11. The device according to claim 7, wherein
when the firmware for update is stored in the third storage region or the fourth storage region, the initialization program further copies the currently used firmware stored in the second storage region to the storage region that stores the firmware that is old among the third storage region and the fourth storage region and then copies the firmware for update to the second storage region.

12. The device according to claim 11, wherein,
when the firmware for update having no operation history cannot communicate with outside via the communication I/F, the initialization program further copies the currently used firmware stored in the third storage region or the fourth storage region to the second storage region.

13. An information processing system comprising a control device and an external non-volatile memory; wherein
the control device is provided with:
a communication I/F that enables communication of the control device with outside,
a built-in non-volatile memory having a first storage region and a second storage region, the first storage region storing an initialization program that carries out initialization operation of the control device, the second storage region storing currently used firmware that is executed after the initialization operation and acquires firmware for update via the communication I/F, a controller that executes the initialization program and the currently used firmware, an external-serial-memory I/F that communicably connects the control device and the external non-volatile memory via a serial bus, a security-mode management module that fixes an access control setting of the built-in non-volatile memory and the external non-volatile memory, and an access controller that outputs a level signal different from the serial bus; and the external non-volatile memory is provided with:

a third storage region, a fourth storage region, and a control register that stores the access control setting applied to the second storage region, the third storage region, and the fourth storage region upon execution of the firmware, wherein the currently used firmware writes the firmware for update to the storage region in which write of the firmware is enabled by the access control setting among the third storage region and the fourth storage region.

14. The system according to claim 13, wherein, in the initialization operation, the initialization program sets the access control setting that prohibits write of the firmware with respect to the second storage region, sets the access control setting that enables write of the firmware with respect to either one storage region of the third storage region and the fourth storage region, and sets the access control setting that prohibits write of the firmware with respect to the other one of the storage regions.

15. The system according to claim 13, wherein the security-mode management module fixes the access control setting after the initialization operation and configures so that the fixation of the access control setting cannot be cancelled until the initialization program is executed after next power-on or reset of the control device.

16. The system according to claim 13, wherein, when the access control setting of the built-in non-volatile memory and the external non-volatile memory is fixed by the security-mode management module by operation of the initialization program, the access controller prohibits write with respect to the control register.

* * * * *